United States Patent Office 3,455,897
Patented July 15, 1969

1

3,455,897
WATER-SOLUBLE REACTIVE METAL-COMPLEX AZO DYESTUFFS CONTAINING HALOGENO-s-TRIAZINE OR PYRIMIDINE GROUPS
Ian Knowles Barben, Manchester, England, assignor to Imperial Chemical Industries Limited, London, England, a corporation of Great Britain
No Drawing. Filed Mar. 10, 1966, Ser. No. 533,254
Claims priority, application Great Britain, Mar. 23, 1965, 12,271/65
Int. Cl. C09b 45/16, 45/18, 45/20
U.S. Cl. 260—146                                5 Claims

ABSTRACT OF THE DISCLOSURE

Water-soluble reactive metal-complex azo dyestuffs containing a s-triazine or pyrimidine nucleus which is substituted by a halogen atom or by a halogenalkylaminosulphonylanilino group, the methods for their production and the use thereof for coloring textile materials containing hydroxyl groups especially cellulose materials.

This invention relates to new water-soluble reactive metal-complex azo dyestuffs, to the methods of preparation thereof and to the use of such dyestuffs for colouring textile materials.

It is known to use dyestuffs containing halogene-s-triazine and halogeno pyrimidine groups for the purpose of colouring fibres containing hydroxyl groups, especially cellulose materials such as cotton and viscose rayon.

These dyestuffs readily fix on such materials with good fastness to wet processing, since the halogeno-s-triazine or halogeno pyrimidine group is able to react with hydroxyl groups of the cellulose molecule in the presence of acid-binding agents, especially at elevated temperatures. For this purpose, the dyestuffs are applied from aqueous solutions or aqueous printing pastes and, owing to a side reaction in which the halogeno-s-triazine or halogenopyrimidine group reacts with water instead of the cellulose molecule, a considerable portion of the dyestuff does not fix on the fibre.

Consequently an excess of dyestuff must be used and the dyeings or prints must be thoroughly washed with boiling soap solutions to remove the unreacted dyestuff. The wastage of dyestuff and extra processing make the dyeing or printing process more expensive, especially when deep shades are required.

The present invention is concerned with the production of water-soluble halogeno-s-triazine and halogenopyrimidine reactive metal-complex azo dyestuffs which have a remarkably high fixation on the fibre and for which washing-off treatments can be reduced considerably.

According to the invention there are provided water-soluble reactive metal-complex azo dyestuffs of the formula:

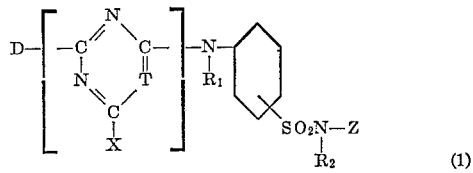

(1)

wherein:

D represents the radical of a metal-complex azo compound connected to the triazine or pyrimidine nucleus through a nitrogen atom, T represents a nitrogen atom or a C—Cl or C—CN radical;

X represents SO₃H, Cl or Br;

2

$R_1$ and $R_2$ each independently represents a hydrogen atom or an alkyl group;

Z represents an alkylene radical containing 2–3 carbon atoms and having a Cl or Br atom in $\beta$ or $\gamma$ position and which may contain other substituents; and the benzene nucleus can be further substituted.

In the above formula, D represents the radical of a metal-complex azo compound, for example the metal-complex of a polyazo, but preferably a monoazo, compound. Suitable metals include, for example, nickel, copper, chromium and cobalt. In order that the dyestuff should be soluble in water, the radical D should contain at least one, and preferably more than one, group imparting solubility in water, e.g. sulphonamide groups, alkyl sulphone groups and more especially acid groups such as carboxylic acid and sulphonic acid groups. This group or these groups can be distributed in D in any desired manner.

For manufacture of the new metal-complex azo dyestuffs, a heterocyclic compound of the formula:

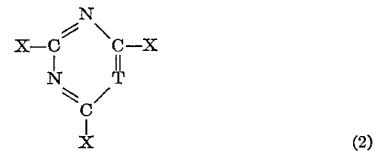

(2)

wherein X and T have the meanings stated above are condensed with a metal-complex azo compound having at least one acylatable NH group and at least one water-solubilising group, and with an amine of the formula:

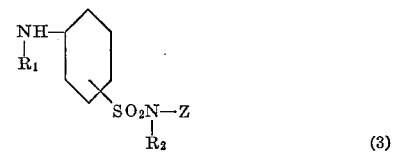

(3)

wherein $R_1$, $R_2$, and Z have the meanings stated above, in the proportion of one mole of amine for each mole of heterocyclic compounds and one mole of heterocyclic compound for each acylatable amino group in the metal complex per mole of metal complex. However, the dyes where X represents a SO₃H group are preferably obtained by treating the compound of formula:

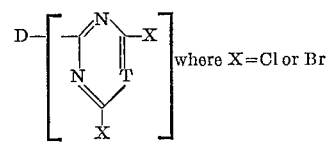 where X=Cl or Br with a sufficient quantity of a metal sulphite to replace both groups X by —SO₃H groups or salts of these groups and reacting the compound so obtained with a compound of Formula 3.

These processes form a further feature of the invention.

As examples of heterocyclic compounds of Formula 2 there may be mentioned, for example, cyanuric chloride, cyanuric bromide, 2,4,5,6 - tetrachloro- and tetrabromopyrimidines and 2,4,6-trichloro- and tribromo-5-cyanopyrimidines.

As examples of amines of Formula 3 there may be mentioned, for example, m- and p-aminobenzene-sulphon-$\beta$-chloroethylamides, m- and p-aminobenzene-sulphon-$\beta$-bromoethylamides, m- and p-aminobenzene-sulphon-$\beta$-chloropropylamides, m- and p-aminobenzene-sulphon-$\beta$-bromopropylamides, m- and p-aminobenzene-sulphon-$\beta$-hydroxy-$\gamma$-Chloropropylamide, m- and p-aminobenzene-sulphon-$\beta$:$\gamma$-dichloropropylamide, 4-sulpho - 3-aminobenzene-sulphon-$\beta$-chloroethylamide, 4-sulpho - 3 - aminobenzene-sulphon-$\beta$-chloropropylamide.

The metal-complex azo compounds used as starting materials can be prepared by known methods, for example by metallisation of metallisable azo compounds which contain, in addition to the groups capable of forming the metal complex, an acylatable amino group, that is to say, a primary or secondary amino group linked to an aromatic nucleus of the molecule directly or through a bridging group, e.g. an alkylene radical or a $SO_2$ group. Suitable metallisable monoazo compounds can be made for example, by coupling an ortho-hydroxy- or ortho-carboxy-diazo compounds of the benzene or naphthalene series, more especially a diazotised ortho-amino-phenol such as a chloro- or nitro-ortho-aminophenol, an ortho-aminophenol-mono- or disulfonic acid or ortho-aminobenzoic acid or a sulfonic acid thereof, with a coupling component that is capable of coupling in vicinal position to a hydroxyl group (or to an enolizable keto group respectively) and contains another such acylatable hydroxyl or amino group or a substituent convertible into such a group. As examples of such coupling components may be mentioned resorcinol and dihydroxynaphthalenes, m-aminophenol, 1-aryl-5-pyrazolones containing in the aryl radical an amino group or a substituent convertible into such a group optionally after manufacture of the dyestuff or after its metallization, such as 1-(2'-, 3'- or 4'-aminophenyl)-3-methyl-5-pyrazolone, 1-(3'- or 4'-aminophenyl)-5-pyrazolone-3-carboxylic acid, furthermore β-ketocarboxylic acid arylamides whose arylide radical contains acylatable amino or hydroxyl groups, and aminonaphthol sulphonic acids such as 2-amino-8-hydroxy-naphthalene-6-sulfonic acid, 2-N-methylamino-8-hydroxy-naphthalene-6-sulfonic acid, 2-alkylamino-5-hydroxynaphthalene-7-sulfonic acid, 2-amino-5-hydroxynaphthalene-7-sulfonic acid, 2-(3'- or 4'-aminobenzoylamino)-5-hydroxynaphthalene-7-sulfonic acid, 2 - (4' - acetylaminophenylamino)-5-hydroxynaphthalene-7-sulfonic acid or 2-(4'-aminophenylamino)-5-hydroxynaphthalene-3':7-disulfonic acid. In selecting the diazo and coupling components it must be ensured that the resultant compound contains at least one water-solubilising group. Useful metallizable compounds are obtained also by reducing o,o'-dihydroxy azo dyestuffs containing nitro groups, or by hydrolysing metallizable azo compounds containing acylamino groups, e.g. by splitting the acyl group of compounds obtainable from o-hydroxydiazo or o-carboxydiazo compounds of the benzene series that contain acylamino groups and the aforementioned coupling components. The hydrolysis can be performed, if desired, during or after metallisation of the compounds.

The conversion of the compounds obtained from the aforesaid components into the complex metal compounds to be used as starting materials in the process of the invention can be performed with compounds or mixtures thereof such as are present in the coupling mixture.

Suitable metal-yielding agents are, for example, those which yield manganese, iron, aluminum and, above all, cobalt, chromium, copper and nickel.

The metal compounds thus obtained can contain one atom of metal for every one or two molecules of azo dyestuff molecules. When copper and nickel are concerned, the resultant metal complex contains one atom of metal for each molecule of azo compound, whereas when chromium and cobalt are concerned, the resultant complex can contain one or two molecules of azo compound, in the latter case not necessarily both the same, for each metal atom.

Suitable metal-yielding agents are, for example, salts that contain the aforementioned metals as the cation such, for example, as chromium sulfates, cobalt acetate, cobalt sulfate, copper sulfate or copper acetate. In some cases it is of advantage to use a complex metal compound, e.g. in the form of a metal-amine complex such as copper-tetramine sulfates from ammonia, pyridine or monoethanolamine, or in the form of compounds in which one of the aforementioned metals is bound in complex union in the anion, e.g. complex chromium compounds of organic hydroxycarboxylic acids, such as salicylic acid or complex cobalt or copper compounds of the alkali metal salts of aliphatic aminocarboxylic acids or hydroxycarboxylic acids such as glycine, lactic acid and above all tartaric acid, such as sodium-copper tartrate.

The treatment with the metal-yielding agent can be performed by a known method, e.g. by heating at a temperature ranging from 50 to 120° in an open vessel, e.g. while refluxing or optionally in a closed vessel under pressure, the pH value being dictated by the chosen metallization method, for example, acid coppering is performed with copper sulfate, alkaline coppering with copper tetramine sulfate. If desired, the metallization can be performed in the presence of a solvent, such, for example, as alcohol, dimethyl formamide or the like.

The condensation, according to the invention, of the heterocyclic compound of Formula 2 with the complex metal compound and with the amine of Formula 3 is advantageously performed in the presence of an acid-acceptor such as sodium hydroxide, sodium carbonate or sodium bicarbonate, and under conditions such that one exchangeable chlorine or bromine atom is left in the finished product. For this purpose it is preferred that the condensations are carried out at relatively low temperature in an aqueous medium and at a pH in the region of neutrality, e.g. between 6 and 8.

According to a modification of the above process, the condensation steps can be performed with a metallizable azo compound and the resultant product metallised, if the compound used is so easy to metallize that the chlorine or bromine atom of the condensation product is not attacked.

The water-soluble reactive metal-complex azo dyestuffs obtained in accordance with the invention are new. They can be used for dyeing and printing a wide variety of textile materials, and are especially valuable for use as reactive dyes for cellulose textile materials, with which they are capable, in the presence of acid-binding agents, of reacting with a high degree of efficiency.

Example 1

To a gently refluxing solution of 16 parts of 1-amino-7-(2'-hydroxy-5'-nitrophenylazo) - 8-naphthol-3:6 - disulphonic acid, the pH of which mixture had been previously adjusted to 6.0 by the addition of a little acetic acid, a solution of 8.8 parts of chromic chloride hexahydrate is added during 30 minutes. After 90 minutes the pH is adjusted to 4.0 by the addition of 2 N sodium carbonate. The mixture is then boiled under reflux for a further 5 hours, cooled to 65° C., the pH is adjusted to 7.8 and then the mixture is screened. The resultant solution is cooled to 20° C. and added slowly to a stirred suspension of 6.7 parts of cyanuric chloride in 50 parts of acetone and 100 parts of ice water at 0–5° C. maintaining a pH of 6.0–6.5 by the simultaneous addition of 2 N sodium carbonate. After stirring for 1 hour at 0–5° C. and at pH 6.0–6.5 the mixture is screened and an acetone solution of 8.2 parts of 4-aminobenzenesulphon-β-chloroethylamide is added. The mixture is then stirred at 40–45° C. for 3 hours maintaining pH of 7 by the addition of 2 N sodium carbonate. The solution is filtered and 75 parts of potassium chloride are added. After stirring fo 1 hour the precipitated dyestuff is filtered off, washed with 15% potassium chloride solution, and dried. When applied to cotton in the presence of an acid-binding agent, it gives black shades.

Example 2

If in place of the 8.8 parts of chromic chloride hexahydrate used in Example 1, 9.3 parts of cobalt sulphate heptahydrate are used, the final dyestuff yields black shades when applied to cotton in the presence of an acid-binding agent.

Example 3

If in place of the 8.2 parts of 4-aminobenzene-sulphon-β-chloroethylamide used in Example 1, 8.5 parts of 4-aminobenzenesulphon-β-chloropropylamide are used a black dyestuff of similar properties is obtained.

Example 4

If in place of the 16 parts of 1-amino-7-(2'-hydroxy-5'-nitrophenylazo)-8-naphthol-3:6-disulphonic acid used in Example 1, 19.05 parts of 1-amino-7-(2'-hydroxy-3'-nitro-5'-sulphophenylazo)-8-naphthol-3:6-disulphonic acid are used a dyestuff is obtained which produces black shades when applied to cotton in the presence of acid-binding agents.

Example 5

200 parts of 100 volume hydrogen peroxide are added slowly to a stirred aqueous solution containing 60 parts of copper acetate and 56.4 parts of 1-acetylamino-7-(4':8'-disulphonaphth-2'-ylazo)-8-naphthol-3:6-disulphonic acid in 1000 parts of water at 10° C. After stirring for 2 hours 48 parts of sodium hydroxide are added to the solution and the mixture is then stirred at 90° C. for 1 hour, cooled and filtered. 240 parts of potassium chloride are added to the screened solution. The precipitate is isolated by filtration, washed with 20% aqueous potassium chloride and dried in air.

A neutral solution of 7.1 parts of the copper complex so obtained in 200 parts of water is added during 30 minutes to a suspension prepared by pouring a solution of 2.0 parts of cyanuric chloride in 10 parts of acetone into 50 parts of ice water. The temperature is maintained at 0–5° C. and the pH is maintained at 6–7 by the addition of 2 N sodium carbonate solution. The mixture is stirred for 1 hour at 0–5° C., then filtered and an acetone solution of 2.7 parts of 4-aminobenzene-sulphon-β-chloropropylamide is added to the screened solution. The temperature is raised to 40–45° C. and the mixture is stirred for 3–4 hours and filtered. 25 parts of sodium chloride are added to the solution and after stirring for a further 30 minutes, the precipitate is filtered off, washed with 10% aqueous sodium chloride solution and dried in air. When applied to cellulose in the presence of acid-binding agents blue colours are obtained.

Example 6

If in place of the 8.2 parts 4-aminobenzenesulphon-β-chloroethylamide used in Example 1, the following are used, dyes are obtained which when applied to cotton in the presence of an acid-binding agent, give black shades:

| | Parts |
|---|---|
| 3-aminobenzenesulphon-β-chloropropylamide | 8.5 |
| 4-aminobenzenesulphon-β-hydroxy-γ-chloropropylamide | 8.9 |
| 3-aminobenzenesulphon-β-hydroxy-γ-chloropropylamide | 8.9 |
| 4-aminobenzenesulphon-β,γ-dichloropropylsulphonamide | 9.6 |
| 3-aminobenzenesulphon-β,γ-dichloropropylamide | 9.6 |
| 4-methylaminobenzenesulphon-β-chloropropylamide | 9.1 |
| 4-aminobenzenesulphon-N-methyl-N-β-chloroethylamide | 8.5 |

Example 7

To a gently refluxing solution of 16 parts of 1-amino-7-(2'-hydroxy-5'-nitrophenylazo)-8-naphthol-3:6-disulphonic acid, the pH of which mixture had been previously adjusted to 6.0 by the addition of a little acetic acid, a solution of 8.8 parts of chromic chloride hexahydrate is added during 30 minutes. After 90 minutes the pH is adjusted to 4.0 by the addition of 2 N sodium carbonate. The mixture is then boiled under reflux for a further 5 hours, cooled to 65° C., the pH is adjusted to 7.8 and then the mixture is screened. The resultant solution is cooled to 20° C. and added slowly to a stirred suspension of 7.8 parts of 5-cyano-2:4:6-trichloropyramidine in 50 parts of acetone and 100 parts of water at 15–20° C. maintaining pH of 6.0–6.5 by the simultaneous addition of 2 N sodium carbonate. After stirring for 1 hour at 15–20° C. and at pH 6.0–6.5 the mixture is screened and an acetone solution of 8.2 parts of 4-aminobenzenesulphon-β-chloroethylamide is added. The mixture is then stirred at 40–45° C. for 3 hours maintaining pH of 7 by the addition of 2 N sodium carbonate. The solution is filtered and 75 parts of potassium chloride are added. After stirring for 1 hour the precipitated dyestuff is filtered off, washed with 15% potassium chloride solution, and dried. When applied to cotton in the presence of an acid-binding agent, it gives black shades.

Example 8

To a neutral suspension of 21 parts of 1-(3-amino-2-methyl-5-sulphophenyl)-4-(2-hydroxy-5-sulphophenylazo-5-pyrazolone-3-carboxylic acid in 150 parts of water a solution of 5.7 parts of cobalt chloride hexahydrate is added, the mixture is then stirred at 50–60° C. for 10 minutes when the pH is readjusted to 7 by the addition of 2 N sodium carbonate. After stirring for a further 15 minutes at 50–60° C., sodium carbonate solution is added to raise the pH to 8 and after filtration the pH of the filtrates is adjusted to 7.0. This solution is then added at 0–5° C. to a stirred suspension of 8.8 parts of cyanuric chloride in 50 parts of acetone and 50 parts of ice water maintaining pH 6.0–6.5 by the simultaneous addition of 2 N sodium carbonate. After stirring for 30 minutes when the addition is complete the mixture is filtered and an acetone solution of 11 parts of 4-aminobenzenesulphon-β-chloropropylamide is added. The solution is then stirred for 3 hours at 35–40° C., whilst maintaining pH 6.5–7.0 by the addition of 2 N sodium carbonate. After filtration the filtrates are treated with potassium acetate to precipitate the dyestuff which is filtered off and dried. When applied to cellulose in the presence of an acid-binding agent it gives orange brown shades.

Example 9

If in place of 16 parts of 1-amino-7-(2-hydroxy-5-nitrophenylazo)-8-naphthol-3:6-disulphonic acid used in Example 1, 17.7 parts of 2-amino-5-hydroxy-6-(6-nitro-2-hydroxy-4-sulphonaphthol-1-ylazo)-naphthalene-7-sulphonic acid are used black shades are obtained on applying the dyestuff to cotton in the presence of an acid-binding agent.

Example 10

If in place of 16 parts of 1-amino-7-(2-hydroxy-5-nitrophenylazo)-8-naphthol-3:6-disulphonic acid used in Example 1, 18.4 parts of 2-(3-sulphophenylamino)-7-(4-amino-2-carboxyphenylazo)-8-naphthol-6-sulphonic acid are used, a dyestuff giving brown shades when applied to cotton in the presence of an acid-binding agent is obtained.

Example 11

If in place of 16 parts of 1-amino-7-(2-hydroxy-5-nitrophenylazo)-8-naphthol-3:6-disulphonic acid used in Example 1, 12.65 parts of 2-amino-6-(2-carboxyphenylazo)-5-naphthol-7-sulphonic acid are used, red-brown shades are obtained on applying the dye to cotton in the presence of an acid-binding agent.

Example 12

If in place of 16 parts of 1-amino-7-(2-hydroxy-5-nitrophenylazo)-8-naphthol-3:6-disulphonic acid used in Example 1, 13.75 parts of 1-(3-aminophenyl)-3-methyl-4-(2-carboxy-4-sulphophenylazo)-5-pyrazolone are used, yellow shades are obtained on applying the dye to cotton in the presence of an acid-binding agent.

Example 13

A neutral solution of 77.9 parts of the copper complex of 2-amino-6-(2'-methoxy-4'-[2",5"-disulphophenylazo]phenylazo)-5-naphthol-1,7-disulphonic acid in 1000 parts of water is added over 30 minutes at 0–5° C. to a suspension of 18.5 parts of cyanuric chloride in 150 parts of acetone and 300 parts of ice water maintaining pH 6–7 by the simultaneous addition of 2 N sodium carbonate solution. After stirring for a further 30 minutes the solution is screened and an acetone solution of 23.5 parts of 4-aminobenzenesulphon-$\beta$-chloroethylamide is added. The mixture is stirred at 35–40° C. and the pH is maintained at 6.0–6.5 by the addition of 2 N sodium carbonate. When the reaction is complete the mixture is screened and the dyestuff is isolated by the addition of potassium chloride. When this dyestuff is applied to cotton in the presence of an acid-binding agent blue shades are obtained.

The preparation of the above copper complex is described in British specification No. 864,080, Example 7.

Example 14

If in place of the 77.9 parts of the copper complex used in Example 13, 59.6 parts of the copper complex of 1-amino-7-(2-hydroxy-3-sulpho-5-aminophenylazo)-8-naphthol-2:4-disulphonic acid are used, blue shades are obtained when the dyestuff is applied to cellulose in the presence of an acid-binding agent.

Example 15

If in place of the 77.9 parts of the copper complex used in Example 13, 61.5 parts of the copper complex of 1-amino-7-(2-hydroxy-3-chloro-5-sulphophenylazo)-8-naphthol-2:4-disulphonic acid are used, blue shades are obtained on applying the dyestuff to cotton in the presence of an acid-binding agent.

Example 16

If in place of the 77.9 parts of the copper complex used in Example 13, 58.1 parts of the copper complex of 2-amino-6-(2-hydroxy-5-sulphophenylazo)-5-naphthol-1,7-sulphonic acid are used, rubine shades are obtained when the dyestuff is applied to cotton in the presence of an acid-binding agent.

Example 17

To a gently refluxing solution of 16 parts of 1-amino-7-(2'-hydroxy-5'-nitrophenylazo)-8-naphthol-3:6-disulphonic acid, the pH of which mixture had been previously adjusted to 6.0 by the addition of a little acetic acid, a solution of 8.8 parts of chromic chloride hexahydrate is added during 30 minutes. After 90 minutes the pH is adjusted to 4.0 by the addition of 2 N sodium carbonate. The mixture is then boiled under reflux for a further 5 hours, cooled to 65° C., the pH is adjusted to 7.8 and then the mixture is screened. The resultant solution is added to a mixture of 7.8 parts of 2:4:5:6-tetrachloropyrimidine in 50 parts of acetone and 100 parts of water at 60–65° C., stirred under a reflux condenser, adjusting the pH to 4–5 by the addition of 2 N sodium carbonate at intervals. After stirring until condensation is complete, an acetone solution of 12 parts of 4-aminobenzenesulphon-$\beta$-chloroethylamide is added and the mixture is then stirred at 80–85° C. for 12 hours maintaining pH 4–5 by the intermittent addition of 2 N sodium carbonate. The solution is filtered and 75 parts of potassium chloride are added.

After stirring for 1 hour the precipitated dyestuff is filtered off, washed with 15% potassium chloride solution, and dried. When applied to cotton in the presence of an acid-binding agent, it gives black shades.

I claim:

1. A water-soluble reactive metal-complex azo dyestuff of the formula

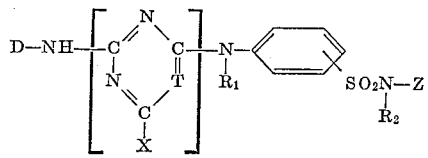

wherein D is the radical of a metal complex azo compound selected from the class consisting of 1:1-copper, 1:2-cobalt and 1:2-chromium complexes of metallisable monoazo compounds of the o-hydroxyphenylazonaphthol, o-carboxyphenylazonaphthol, o,o'-dihydroxyazonaphthalene, o-hydroxyphenylazopyrazolone and o-carboxyphenylazopyrazolone series, which monoazo compound contains at least one $SO_3H$ group, said radical D being directly attached to the linking group NH through an aromatic nucleus of said monoazo compound;

T represents a radical selected from the group consisting of N, C—Cl or C—CN;

X represents a radical selected from the group consisting of $SO_3H$, Cl or Br;

$R_1$ and $R_2$ each are independently selected from the group consisting of a hydrogen atom or a methyl group;

Z represents an alkylene radical containing 2–3 carbon atoms and carrying a member selected from the group consisting of a chlorine and bromine atom selectively in the $\beta$- and $\gamma$-positions.

2. The water-soluble reactive metal-complex azo dyestuff of claim 1 wherein the alkylene radical represented by Z is further substituted with a member selected from the class consisting of chlorine, bromine and hydroxyl radicals.

3. The 1:2 chromium complex of the dyestuff having the formula:

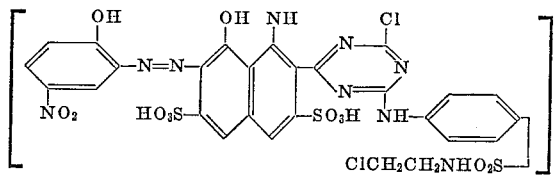

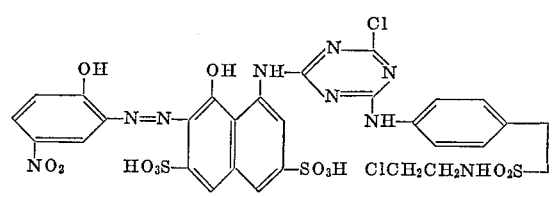

4. The 1:1 copper complex of the dyestuffs having the formula:

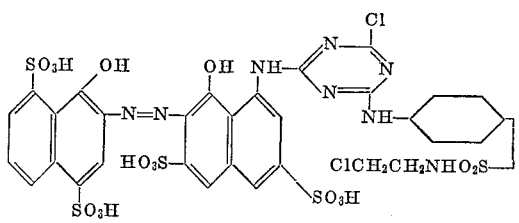

5. The 1:2 cobalt complex of the dyestuff having the formula:
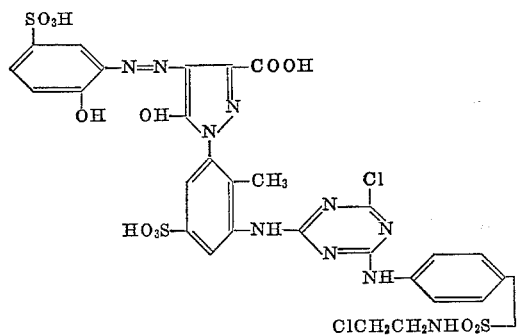
References Cited
UNITED STATES PATENTS
3,297,678  1/1967  Kuhne et al. _____ 260—153
FLOYD D. HIGEL, Primary Examiner
U.S. Cl. X.R.
8—42; 260—147, 153, 154, 163, 198, 194, 248, 251, 556